US007650635B2

(12) United States Patent
Khare et al.

(10) Patent No.: US 7,650,635 B2
(45) Date of Patent: Jan. 19, 2010

(54) METHOD AND APPARATUS FOR PREVENTING NETWORK ATTACKS BY AUTHENTICATING INTERNET CONTROL MESSAGE PROTOCOL PACKETS

(75) Inventors: Amol Khare, Sunnyvale, CA (US); Mitesh Dalal, Santa Clara, CA (US); Anantha Ramaiah, Sunnyvale, CA (US); Sharad Ahlawat, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 709 days.

(21) Appl. No.: 10/820,980

(22) Filed: Apr. 7, 2004

(65) Prior Publication Data

US 2005/0229244 A1 Oct. 13, 2005

(51) Int. Cl.
*G06F 9/00* (2006.01)
*G06F 15/16* (2006.01)
*G06F 17/00* (2006.01)
*G06F 12/00* (2006.01)
*G06F 12/14* (2006.01)
*G06F 13/00* (2006.01)
*G06F 12/16* (2006.01)
*G11C 11/00* (2006.01)
*G08B 23/00* (2006.01)
*G06F 15/173* (2006.01)

(52) U.S. Cl. .............. 726/13; 726/17; 726/22; 709/225; 709/238

(58) Field of Classification Search .............. 709/225, 709/238; 726/13, 11, 22
See application file for complete search history.

(56) References Cited

U.S. PATENT DOCUMENTS

| 6,219,706 B1 * | 4/2001 | Fan et al. ............... 709/225 |
| 6,513,122 B1 | 1/2003 | Magdych et al. |
| 6,779,033 B1 | 8/2004 | Watson et al. |
| 7,069,438 B2 | 6/2006 | Balabine et al. |
| 7,076,555 B1 | 7/2006 | Orman et al. |
| 2003/0140124 A1 | 7/2003 | Burns |
| 2004/0006643 A1 | 1/2004 | Dolson et al. |
| 2004/0013112 A1 * | 1/2004 | Goldberg et al. ......... 370/389 |
| 2004/0148520 A1 * | 7/2004 | Talpade et al. ........... 713/201 |

OTHER PUBLICATIONS

Stewart, R., "Transmission Control Protocol security considerations draft-ietf-tcpm-tcpsecure-00.txt", Network Working Group (Draft, 2004); pp. 1-10.

(Continued)

*Primary Examiner*—Shin-Hon Chen
(74) *Attorney, Agent, or Firm*—Hickman Palermo Truong & Becker LLP

(57) ABSTRACT

A method of preventing an attack on a network, the method comprising the computer-implemented steps of receiving an ICMP packet that includes a copy of a header associated with a connection in a connection-oriented transport protocol; obtaining a packet sequence value from the header; determining if the packet sequence value is valid; and updating a parameter value associated with the transport protocol connection only if the packet sequence value is determined to be valid. Use of the disclosed method enables authenticating ICMP packets so that responsive measures of a network element, such as adjusting an MTU value, are performed only when the ICMP packet is determined to be authentic.

42 Claims, 4 Drawing Sheets

OTHER PUBLICATIONS

"Transmission Control Protocol", *Information Sciences Institute* (1981), 89 pages.

International Searching Authority, "Notification of Transmittal of the International Search Report and the Written Opinion of the International Searching Authority, or the Declaration," PCT/US05/08859, report dated Jun. 8, 2005, 8 pages.

Bellovin, S., "Defending Against Sequence Number Attacks" May 1996, Network Working Group, Request for Comments: 1948 (6 pages).

Office Action from Chinese patent application No. 200580010423.0, dated Apr. 10, 2009, 1 pg.

* cited by examiner

METHOD AND APPARATUS FOR PREVENTING NETWORK ATTACKS BY AUTHENTICATING INTERNET CONTROL MESSAGE PROTOCOL PACKETS

FIELD OF THE INVENTION

The present invention generally relates to preventing attacks on computer networks. The invention relates more specifically to a method for preventing network attacks that are perpetrated through the Internet Control Message Protocol.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Networks and internetworks that are based on Transmission Control Protocol and Internet Protocol (TCP/IP) rely on the Internet Control Message Protocol ("ICMP") for handling error conditions in the network. ICMP is defined in RFC (Request for Comments) 792 of the Internet Engineering Task Force (IETF). Routers, switches and other network elements that participate in an internetwork or the global Internet use ICMP to exchange error-handling information. ICMP agents running on such network elements can generate error messages, such as ICMP destination unreachable messages, and informational messages, such as ICMP echo request and reply messages.

The response taken by a router upon receiving an ICMP error message packet depends on a type value carried in the ICMP packet. No authentication of the source of an ICMP packet is required in RFC 792, and implementations of ICMP do not provide such authentication. Most implementations of ICMP do verify the IP addresses and sometimes the TCP port numbers that are carried in ICMP packets, but this level of verification is insufficient to prevent most kinds of attacks. As a result, spoofed ICMP packets can give a false impression of error conditions, causing routers to respond in an unwanted manner to the non-existent error conditions. Certain responses can result in denial of service to clients, or poor quality of service. Therefore, network administrators desire to have a way for a router or other network element to determine the authenticity of an ICMP packet before performing a responsive action.

The following is an example of how disastrous results can be caused by just one spoofed ICMP packet. Path MTU discovery (PMTU) is a method used by TCP to intelligently discover the path maximum transmission unit (MTU) for a particular connection. The objective is to find the MTU value for a path, in order to use that MTU value for the TCP segment size, rather than the default TCP segment size of 536. PMTU seeks to find a minimum MTU that is higher than 536, hence resulting in higher throughput of data along the path.

PMTU discovery is performed by sending ICMP packets in which the "Do Not Fragment" (DF) bit in the IP header is set and having successively higher segment size values. A smaller MTU is discovered when an ICMP "unreachable"-type packet is received that includes the MTU of the interface that caused an error for the specified segment size value. The corrective action taken by a TCP implementation is to use the MTU value that is embedded in the ICMP packet for the next few minutes, after which a higher value is attempted. Using the same MTU value for ten (10) minutes is typical.

However, the ICMP unreachable packet is easily spoofed by an unauthorized or malicious party. The only specific information needed to spoof this packet is a four-tuple of values comprising two IP addresses and two port numbers. One port number is typically a well-known port number, and the other port number can be guessed readily because most TCP implementations simply increment the well-known port number to create port numbers for successive connections. Further, a malicious party often can obtain the IP addresses of routers participating in TCP connections from Border Gateway Protocol (BGP) flow maps that are published within the Internet.

TCP hosts are allowed to accept MTU values as low as 68, reflecting 28 bytes of data after accounting for 40 bytes of TCP-IP header data. Therefore, a spoofed ICMP packet that advertises an MTU of 70 bytes will cause a TCP implementation to use 30 bytes as the segment size for the 10 minutes. Receiving and processing another spoofed ICMP packet with an MTU of 70 after ten minutes will result in continuing the connection in a throttled condition for another 10 minutes.

Examples of TCP applications using PMTU include BGP and FTP, which often need to exchange large amounts of data. These applications and others may be vulnerable to the attacks described herein. For protocols like BGP, packet transmission time is extremely critical, and throttling a connection can cause disastrous consequences. Implementations of TCP in the FreeBSD operating system, and derivatives of FreeBSD, are believed to be vulnerable to the attack identified above. Many other TCP stack implementations exhibit the same exploitable behavior. Under version 6 of the Internet Protocol (IPv6), ICMP packets are used in the neighbor discovery process, path MTU discovery, and the Multicast Listener Discovery (MLD) protocol. IPv6 routers use MLD to discover multicast listeners, comprising nodes that want to receive multicast packets destined for specific multicast addresses, on directly attached links. A value of 58 in the Next Header field of the basic IPv6 packet header identifies an IPv6 ICMP packet. A similar identifier is used in IPv4. ICMP packets in IPv6 are like a transport layer packet in the sense that the ICMP packet follows all the extension headers and is the last piece of information in the IPv6 packet.

Within IPv6 ICMP packets, the ICMPv6 Type and ICMPv6 Code fields identify IPv6 ICMP packet specifics, such as the ICMP message type. The value in the Checksum field is derived from the fields in the IPv6 ICMP packet and the IPv6 header. The ICMPv6 Data field contains error or diagnostic information relevant to IP packet processing.

Both ICMPv4 and ICMPv6 are often blocked by security policies implemented in corporate firewalls because of attacks based on ICMP. There is no widespread technique in use for preventing network attacks based on ICMP for routers that use IPv4. While ICMPv6 has the capability to use IPSec authentication and encryption, which decrease the possibilities of an attack based on ICMPv6, the deployed base of IPv4 routers is very large, and these routers need a solution for preventing ICMP-based attacks.

Under RFC 792, IPv4 ICMP error packets comprise a copy of the IP header of the original packet that generated an error, and at least eight (8) bytes of data from the payload of the original IP packet. In one prior approach, the IP addresses carried in the IP header, and the TCP port numbers carried in the transport header, if present, are used to select a particular application or service in the router. However, this prior approach does not perform any form of authentication on the packet.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
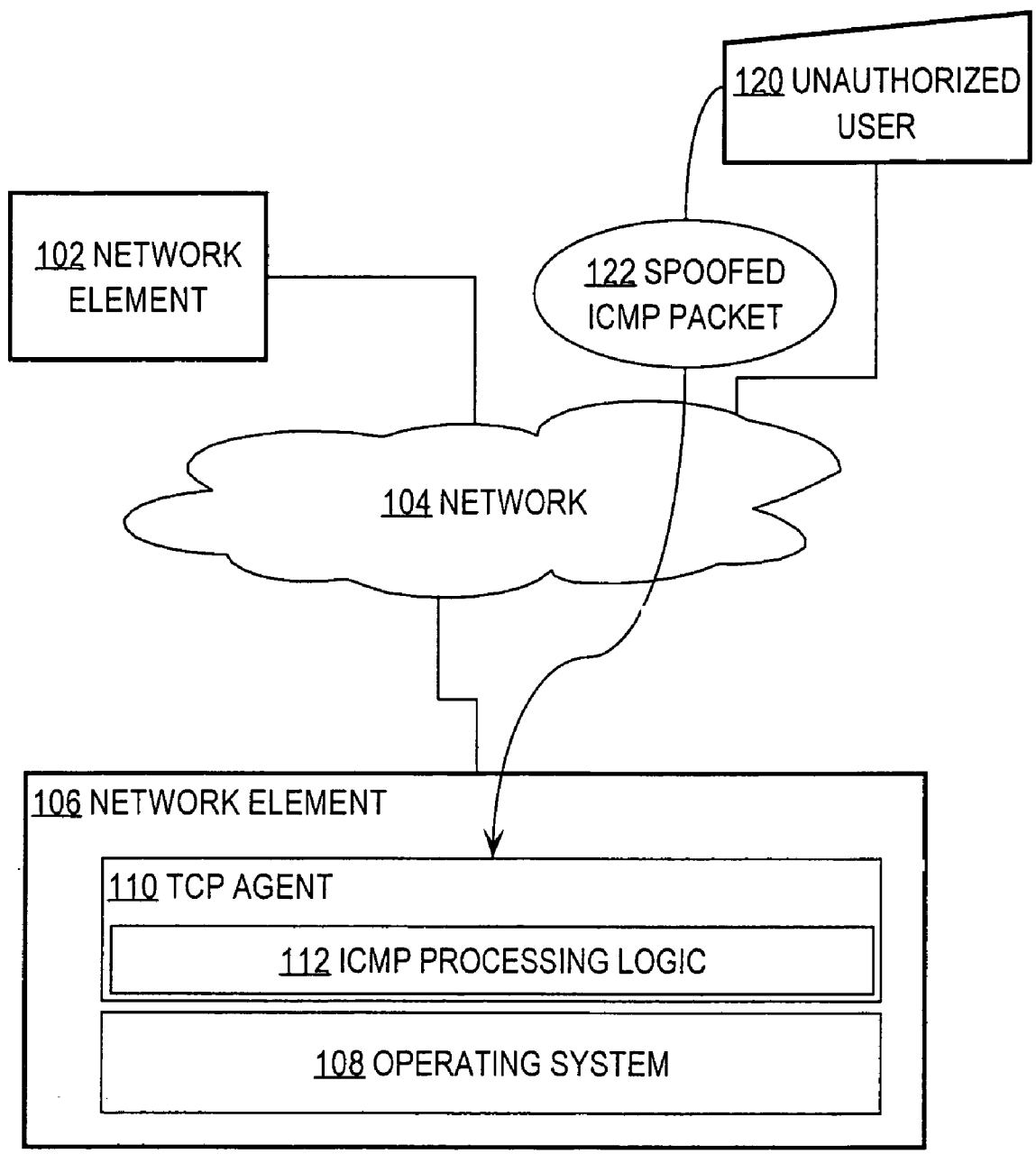
FIG. 1 is a block diagram that illustrates an overview of a network of nodes that use a connection-oriented transport protocol for packet data communications.

A method and apparatus for preventing network attacks by authenticating Internet Control Message Protocol packets is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of Authenticating Internet Control Message Protocol Packets
4.0 Implementation Mechanisms—Hardware Overview
5.0 Extensions and Alternatives

1.0 General Overview

The needs identified in the foregoing Background, and other needs and objects that will become apparent for the following description, are achieved in the present invention, which comprises, in one aspect, a method for preventing an attack on a network, the method comprising the computer-implemented steps of receiving an ICMP packet that includes a copy of a header associated with a connection in a connection-oriented transport protocol; obtaining a packet sequence value from the header; determining if the packet sequence value is valid; and updating a parameter value associated with the transport protocol connection only if the packet sequence value is determined to be valid. Use of the disclosed method enables authenticating ICMP packets so that responsive measures of a network element, such as adjusting an MTU value, are performed only when the ICMP packet is determined to be authentic. Unlike prior approaches, transport layer or application-layer protocol information embedded in the ICMP packet is used to authenticate the packet.

According to one feature, the step of receiving an ICMP packet comprises receiving an ICMP packet that includes a copy of a TCP header associated with a TCP connection. In another feature, the step of receiving an ICMP packet comprises receiving an ICMP "endpoint unreachable" error packet. In yet another feature, receiving an ICMP packet comprises receiving an ICMP packet that specifies that fragmentation is needed.

In one feature, the step of determining if the packet sequence value is valid comprises determining if the packet sequence value is within a range of packet sequence values that are allowed by the transport protocol for the connection. In another feature, determining if the packet sequence value is valid comprises determining if the packet sequence value is within a range of sent but unacknowledged TCP packet sequence values for the connection. In yet another feature, determining if the packet sequence value is valid comprises determining if the packet sequence value is equal to one or more sequence values of one or more packets that are then-currently stored in a TCP re-transmission buffer.

In one embodiment, the foregoing steps are performed in a router acting as a TCP endpoint node. In another embodiment, the steps are performed in a firewall device.

In other aspects, the invention encompasses a computer apparatus and a computer-readable medium configured to carry out the foregoing steps.

2.0 Method of Preventing Network Attacks by Authenticating ICMP Packets

2.1 Structural Overview

FIG. 1 is a block diagram that illustrates an overview of a network of nodes that use a connection-oriented transport protocol for packet data communications. A first network element 102 is communicatively coupled, directly or indirectly through a network 104, to a second network element 106. Network 104 may comprise one or more local area networks, wide area networks, internetworks, or a combination thereof, using any form of communication link including wire cable, optical links, infrared links, or radio-frequency wireless links.

In one embodiment, network elements 102, 106 each comprise a router, switch, or other element of network infrastructure. For purposes of illustrating a simple and clear example, FIG. 1 depicts only two network elements 102, 106. However, in other embodiments, any number of network elements may communicate with or participate in network 104. Further, other common elements of a complete network system are omitted for clarity, such as personal computers, workstations, printers, servers, and other end stations or content sources.

In one embodiment, network 104 is a TCP/IP packet-switched network elements 102, 106 communicate through the network using IP, TCP, and ICMP. To support such communications, network element 106 functions as a TCP endpoint node, terminating TCP connections that originate at network element 102, or end station clients of network element 102. Network element 106 hosts or executes an operating system 108 that manages one or more applications including a TCP/IP agent 110 that implements TCP. TCP/IP agent 110 includes or can access ICMP processing logic 112, which implements ICMP. In an alternative embodiment, network element 106 may comprise a personal computer or workstation that implements a TCP/IP stack providing implementations of IP, TCP and ICMP.

In this environment, network elements 102, 106 can communicate using IP packets and TCP segments that include ICMP messages. Many such messages may be proper and legitimate and may cause network element 106 to perform proper responsive action, such as adjusting an MTU value to account for bandwidth restrictions of network element 102 or network 104. However, an unauthorized user 120 that is communicatively coupled to network 104 may send one or more spoofed ICMP packets 122 to network element 106 by determining the IP addresses and port number values that network element 102 and network element 106 are using to communicate. If a spoofed ICMP packet 122 contains an unreasonably small MTU value, then network element 106 may throttle the MTU value that it uses, causing performance problems.

2.2 Functional Overview

In one approach, a method to authenticate ICMP packets is provided. Authenticating ICMP packets enables a network node to prevent performing any error-correcting action that would normally be required in response to spoofed ICMP packets. In particular, transport information or application layer information embedded in an ICMP packet may be used for authenticating the ICMP packet. In past approaches, only a part of this information, such as the transport layer port numbers, has been used in a limited way to de-multiplex the ICMP packet to the correct transport protocol or application.

In one embodiment of the approaches herein, the first eight (8) bytes of the TCP header can be used to authenticate the ICMP packet, thus eliminating the possibility of an unauthorized sender perpetrating a denial of service attack for applications that use TCP. As defined in the TCP RFCs, the first eight bytes of the TCP header contain two port number values and a TCP sequence number relating to a TCP connection between two network nodes. The sequence number identifies a TCP segment that caused a downstream node to identify an error and to generate the ICMP packet in response to the error.

According to various embodiments, two approaches are provided for using the TCP sequence number to authenticate the ICMP packet. In a first approach, the sequence number is tested to determine whether it is within the range of sent but unacknowledged sequence numbers that are then currently in effect for the associated TCP connection. In certain implementations of TCP, the range of sent but unacknowledged sequence numbers is defined by software variables named "snduna" and "sndnxt."

In a second approach, which provides a stricter test, an attempt is made to match the received sequence number to sequence numbers present in each TCP segment that is stored in the retransmission queue or buffer that is maintained by the TCP implementation. The TCP retransmission queue holds a copy of every segment as sent out in its original form. If the received ICMP packet is authentic, then the sequence number in the ICMP packet must match the sequence number of one of the segments in the retransmission queue.

Figure 2:
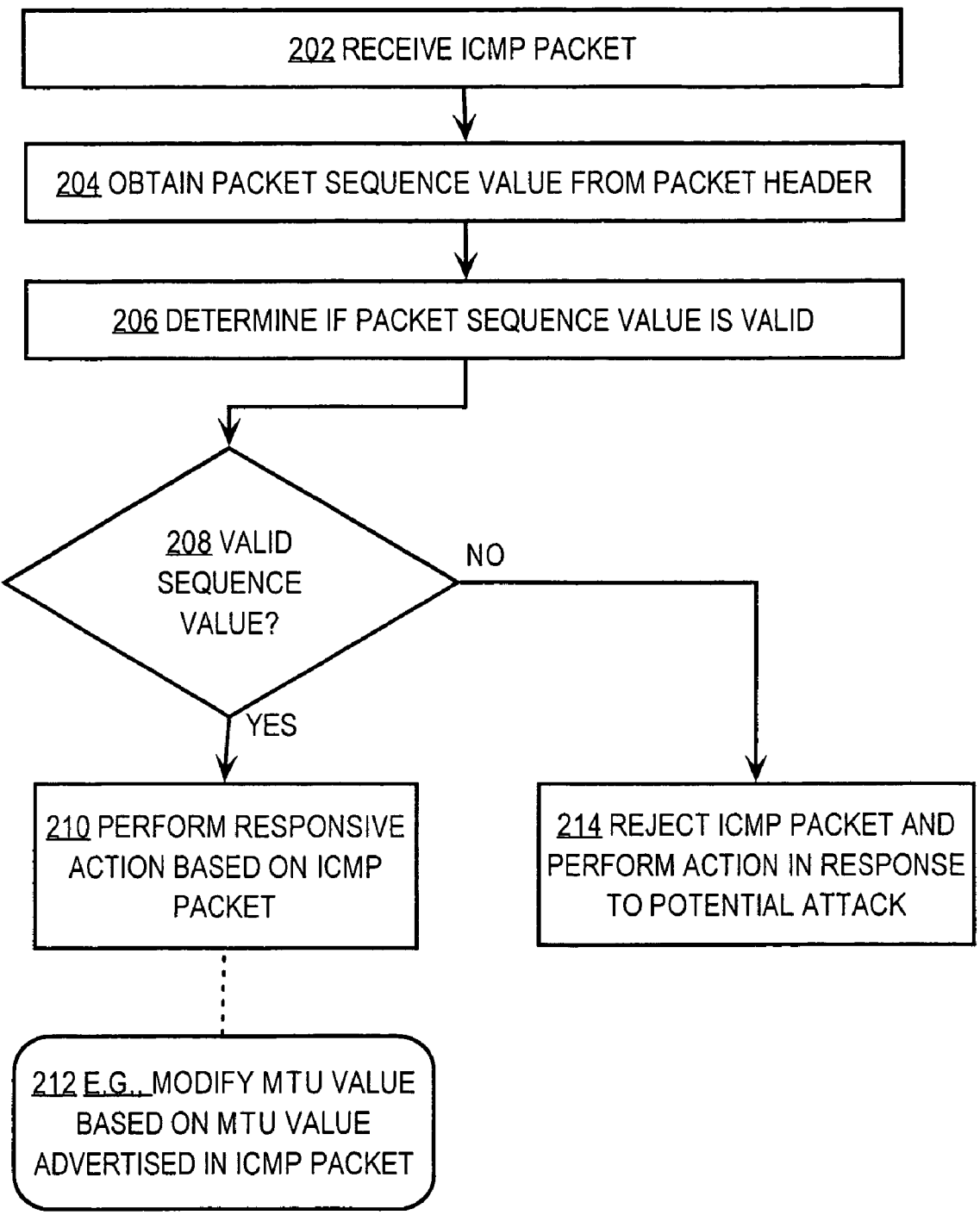
FIG. 2 is a flow diagram that illustrates a high level overview of one embodiment of a method for preventing network attacks by authenticating ICMP packets.
Figure 3:
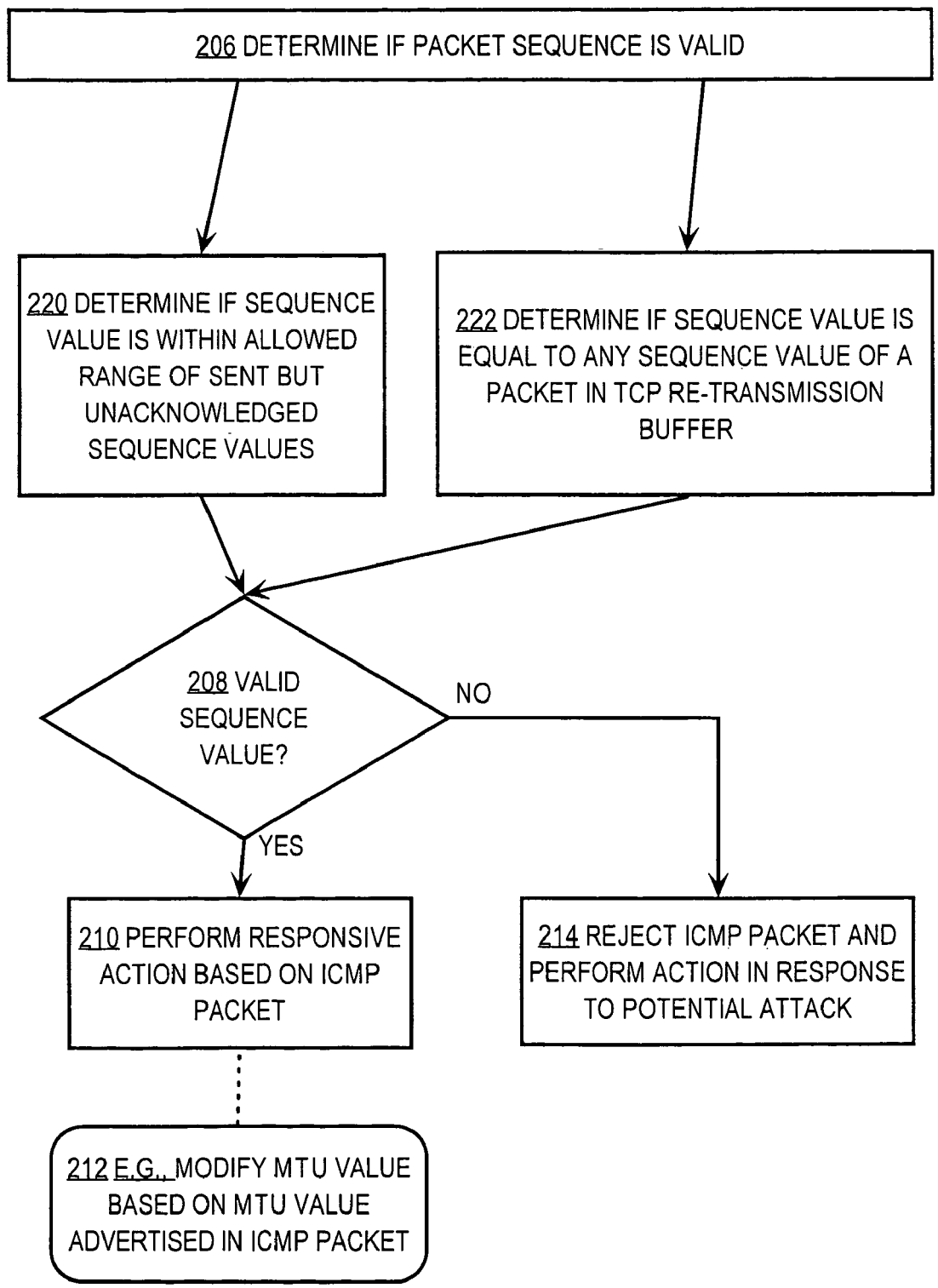
FIG. 3 is a flow diagram of alternative approaches for authenticating ICMP packets.

FIG. 2 is a flow diagram that illustrates a high level overview of one embodiment of a method for preventing network attacks by authenticating ICMP packets. FIG. 3 is a flow diagram of alternative approaches for authenticating ICMP packets. The processes of both FIG. 2 and FIG. 3 may be implemented using one or more machines, computer programs, processes, or software elements. In one embodiment, the processes of FIG. 2, FIG. 3 are implemented as sequences of program instructions as part of ICMP processing logic 112.

Referring first to FIG. 2, in step 202, an ICMP packet is received. For example, in step 202, network element 106 receives an ICMP packet from either network element 102 or unauthorized user 120. In one embodiment, the process of FIG. 2 is performed only for received ICMP packets that have a type code indicating that it is an ICMP "unreachable" type error packet and a value indicating that segment fragmentation and/or a change in MTU is needed.

In step 204, a packet sequence value is obtained from a header of the received packet. For example, a network element implementing the process of FIG. 2 extracts a TCP sequence number from an IP header that is carried in the ICMP packet.

In step 206 and step 208, a test is performed to determine if the packet sequence value is valid. If the sequence value is valid, then in step 210 responsive action is performed based on the ICMP packet. For example, the responsive action may include modifying an MTU value of a network element that is performing steps 202-210, based on an MTU value that is advertised in the ICMP packet, as indicated in step 212. However, step 212 is merely one example, and any other appropriate responsive action may be performed in other embodiments.

If the test of steps 206-208 evaluates to false, then in step 214, the ICMP packet is rejected, and optionally action may be performed in response to a potential attack. Rejecting the ICMP packet may comprise dropping the packet, not performing responsive action that is otherwise conventional in response to an ICMP packet, or performing responsive action such as modification of the MTU value only when an exact match of a received sequence value is found at step 222, etc. Optional responsive actions performed at step 214 may include creating a log entry, etc.

Several approaches may be used to determine if a packet sequence value is valid at step 206. Referring now to FIG. 3, two alternative approaches are shown as examples. In one approach represented by step 220, step 206 involves determining if the sequence value of a received ICMP packet is within an allowed range of sequence values that have been sent by a TCP implementation but unacknowledged by a receiving node. In a TCP software implementation that uses conventional variable names, the test of step 220 may comprise determining if the sequence value of a received ICMP packet is within the values "sndnxt" and "snduna" maintained by the implementation.

In another approach, represented by step 222, a test is performed to determine if the received sequence value is equal to any sequence value of a packet in the TCP re-transmission buffer that is maintained by a TCP implementation. The TCP re-transmission buffer will contain a copy of all TCP segments that have been actually sent, and therefore can serve as a reference repository for all known valid sequence values. This approach requires slightly additional processing resources than the first approach because comparisons are required for all segments in the re-transmission buffer. However, in typical implementations, the additional processing time is not burdensome.

After performing the approaches of either step 220 or step 222, control proceeds to steps 208-214, which are described above with reference to FIG. 2.

Although the example provided above is presented in the context of communications using TCP, the approaches described herein can work with any other transport protocol or application information depending on the information available in the respective header. Any connection-oriented transport-layer protocol that uses the equivalent of sequence values may be used. For example, the approaches may be applicable to any connection-oriented transport protocol. The approaches provide protection for applications such as BGP, VPN, OSPF, various voice-over-IP protocols, or other higher-level protocols that depend on TCP, provide header information or sequence values that can be checked, or that incorporate IP header information that can be checked. The approaches herein can eliminate the possibility of network nodes performing disastrous error-correction actions in response to spoofed ICMP packets.

The approaches herein provide an effective security solution that is applicable to most transport protocols and applications that use connection-oriented transport protocols and that depend on ICMP feedback or error messages. The approaches herein can be applied in several scenarios such as denial-of-service attack prevention, enhancing robustness to false alarms, and TCP proxy mechanisms.

3.0 Implementation Mechanisms—Hardware Overview

Figure 4:
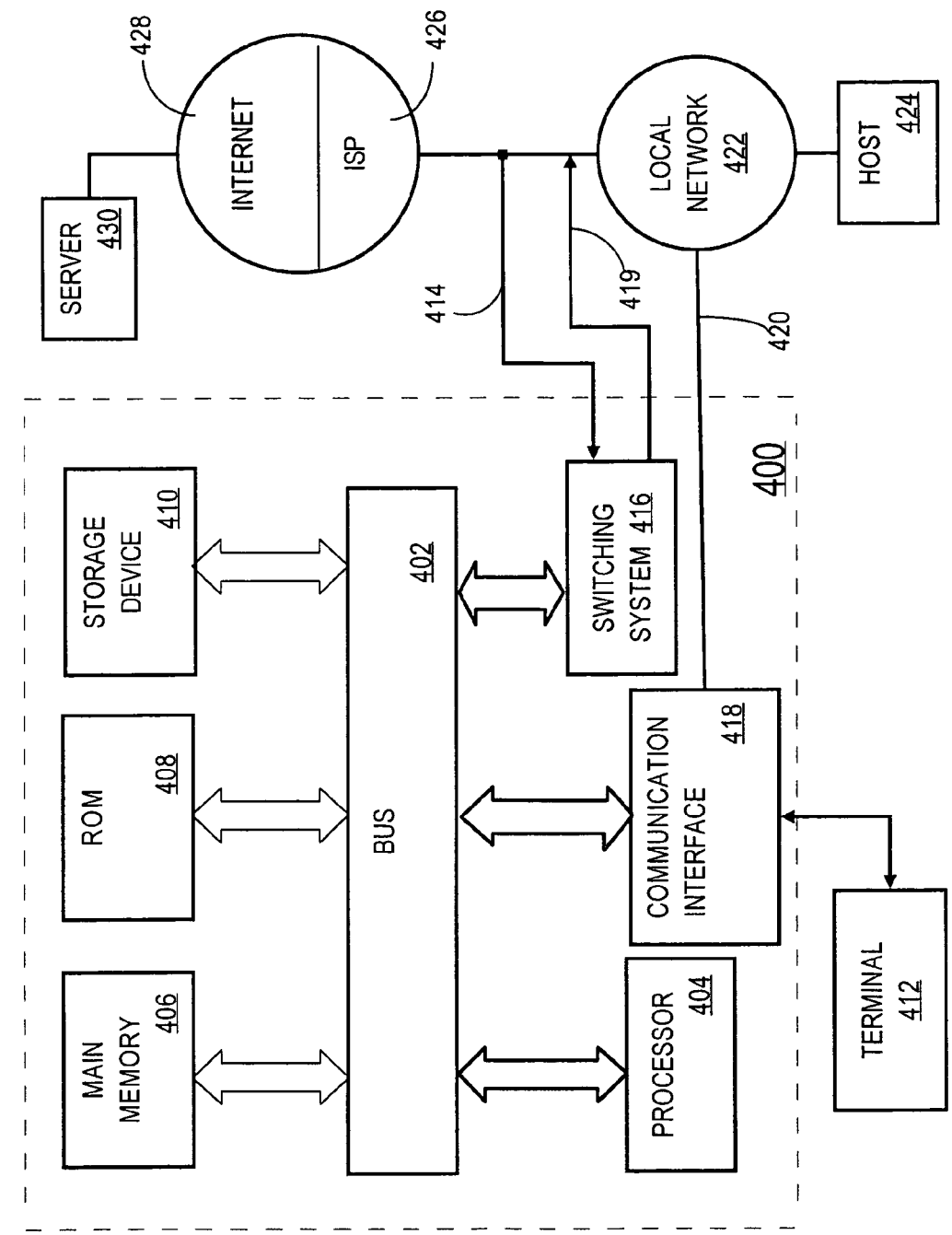
FIG. 4 is a block diagram that illustrates a computer system upon which an embodiment may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for preventing network, attacks by authenticating Internet Control Message Protocol packets. According to one embodiment of the invention, preventing network attacks by authenticating Internet Control Message Protocol packets is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for preventing network attacks by authenticating Internet Control Message Protocol packets as described herein.

The received code may be executed by processor 404 as it is received, and/or stored in storage device 410, or other non-volatile storage for later execution. In this manner, computer system 400 may obtain application code in the form of a carrier wave.

4.0 Extensions and Alternatives

In the foregoing specification, the invention has been-described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of preventing an attack on a network, the method comprising the computer-implemented steps of:
    receiving an ICMP packet, wherein the ICMP packet carries a packet sequence value that is associated with a connection in a connection-oriented transport protocol, and that identifies a transport protocol segment that caused a node to identify an error and to generate the ICMP packet in response to the error;
    obtaining the packet sequence value from the ICMP packet;
    authenticating the ICMP packet by determining if the packet sequence value from the ICMP packet is valid; and
    responding to the ICMP packet to correct the error by updating a maximum transmission unit value or a minimum transmission unit value associated with the connection only if the packet sequence value is determined to be valid;
    wherein the steps of receiving, obtaining, authenticating, and responding are performed by one or more computing devices.

2. A method as recited in claim 1, wherein the ICMP packet carries a portion of a TCP header associated with a TCP connection.

3. A method as recited in claim 1, wherein the step of receiving an ICMP packet comprises receiving an ICMP "endpoint unreachable" error packet.

4. A method as recited in claim 1, wherein the step of receiving an ICMP packet comprises receiving an ICMP packet that specifies that fragmentation is needed.

5. A method as recited in claim 1, wherein the step of authenticating the ICMP packet by determining if the packet sequence value is valid comprises determining if the packet sequence value is within a range of packet sequence values that are allowed by the transport protocol for the connection.

6. A method as recited in claim 1, wherein the step of authenticating the ICMP packet by determining if the packet sequence value is valid comprises determining if the packet sequence value is within a range of sent but unacknowledged TCP packet sequence values for the connection.

7. A method as recited in claim 1, wherein the step of authenticating the ICMP packet by determining if the packet sequence value is valid comprises determining if the packet sequence value is exactly equal to one or more sequence values of one or more packets that are then-currently stored in a TCP re-transmission buffer, starting at a sequence value of a previously sent segment that resulted in receiving the ICMP packet.

8. A method as recited in claim 1, wherein the steps are performed in a router acting as a TCP endpoint node.

9. A method as recited in claim 1, wherein the steps are performed in a firewall device.

10. A method of preventing an attack on a network, the method comprising the computer-implemented steps of:
    receiving, at a TCP endpoint node in a TCP/IP packet-switched network, an ICMP packet, wherein the ICMP packet carries a packet sequence value that is associated with a TCP connection, and that identifies a TCP segment that caused a node to identify an error and to generate the ICMP packet in response to the error;
    obtaining a packet sequence number from the ICMP packet;
    authenticating the ICMP packet by determining if the packet sequence number from the ICMP packet is valid; and
    responding to the ICMP packet to correct the error by updating a maximum transmission unit (MTU) value associated with the TCP connection only if the packet sequence number is determined to be valid;
    wherein the steps of receiving, obtaining, authenticating, and responding are performed by one or more computing devices.

11. A method as recited in claim 10, wherein the step of receiving an ICMP packet comprises receiving an ICMP "endpoint unreachable" error packet.

12. A method as recited in claim 10, wherein the step of receiving an ICMP packet comprises receiving an ICMP packet that specifies that fragmentation is needed.

13. A method as recited in claim 10, wherein the step of authenticating the ICMP packet by determining if the packet sequence number is valid comprises determining if the packet sequence number is within a range of TCP packet sequence numbers that are allowed for the connection.

14. A method as recited in claim 10, wherein the step of authenticating the ICMP packet by determining if the packet sequence value is valid comprises determining if the packet sequence number is within a range of sent but unacknowledged TCP packet sequence values for the connection.

15. A method as recited in claim 10, wherein the step of authenticating the ICMP packet by determining if the packet sequence value is valid comprises determining if the packet sequence number is equal to one or more sequence numbers of one or more packets that are then-currently stored in a TCP re-transmission buffer, starting at a sequence value of a previously sent segment that resulted in receiving the ICMP packet.

16. A method as recited in claim 10, wherein the steps are performed in a router acting as a TCP endpoint node.

17. A method as recited in claim 10, wherein the steps are performed in a firewall device.

18. A computer-readable medium that is selected from a group consisting of non-volatile media, and volatile media, carrying one or more sequences of instructions, which instructions, when executed by one or more processors, cause the one or more processors to perform the steps of:
    receiving an ICMP packet, wherein the ICMP packet carries a packet sequence value that is associated with a connection in a connection-oriented transport protocol, and that identifies a transport protocol segment that caused a node to identify an error and to generate the ICMP packet in response to the error;

obtaining the packet sequence value from the ICMP packet;

authenticating the ICMP packet by determining if the packet sequence value from the ICMP packet is valid; and responding to the ICMP packet to correct the error by updating a maximum transmission unit value or a minimum transmission unit value associated with the connection only if the packet sequence value is determined to be valid.

19. A computer-readable medium as recited in claim 18, wherein the ICMP packet carries a portion of a TCP header associated with a TCP connection.

20. A computer-readable medium as recited in claim 18, wherein the instructions that cause performing receiving an ICMP packet comprises instructions which when executed cause receiving an ICMP "endpoint unreachable" error packet.

21. A computer-readable medium as recited in claim 18, wherein the instructions that cause performing receiving an ICMP packet comprises instructions which when executed cause receiving an ICMP packet that specifies that fragmentation is needed.

22. A computer-readable medium as recited in claim 18, wherein the instructions that cause performing authenticating the ICMP packet by determining if the packet sequence value is valid comprises instructions which when executed cause determining if the packet sequence value is within a range of packet sequence values that are allowed by the transport protocol for the connection.

23. A computer-readable medium as recited in claim 18, wherein the instructions that cause performing authenticating the ICMP packet by determining if the packet sequence value is valid comprises instructions which when executed cause determining if the packet sequence value is within a range of sent but unacknowledged TCP packet sequence values for the connection.

24. A computer-readable medium as recited in claim 18, wherein the instructions that cause performing authenticating the ICMP packet by determining if the packet sequence value is valid comprises instructions which when executed cause determining if the packet sequence value is exactly equal to one or more sequence values of one or more packets that are then-currently stored in a TCP re-transmission buffer, starting at a sequence value of a previously sent segment that resulted in receiving the ICMP packet.

25. An apparatus for preventing an attack on a network, comprising:

means for receiving an ICMP packet, wherein the ICMP packet carries a packet sequence value that is associated with a connection in a connection-oriented transport protocol, and that identifies a transport protocol segment that caused a node to identify an error and to generate the ICMP packet in response to the error;

means for obtaining the packet sequence value from the ICMP packet;

means for authenticating the ICMP packet by determining if the packet sequence value from the ICMP packet is valid; and means for responding to the ICMP packet to correct the error by updating a maximum transmission unit value or a minimum transmission unit value associated with the connection only if the packet sequence value is determined to be valid.

26. An apparatus as recited in claim 25, wherein the means for receiving an ICMP packet comprises means for receiving an ICMP packet, wherein the ICMP packet carries a portion of a TCP header associated with a TCP connection.

27. An apparatus as recited in claim 25, wherein the means for receiving an ICMP packet comprises means for receiving an ICMP "endpoint unreachable" error packet.

28. An apparatus as recited in claim 25, wherein the means for receiving an ICMP packet comprises means for receiving an ICMP packet that specifies that fragmentation is needed.

29. An apparatus as recited in claim 25, wherein the means for authenticating the ICMP packet by determining if the packet sequence value is valid comprises means for determining if the packet sequence value is within a range of packet sequence values that are allowed by the transport protocol for the connection.

30. An apparatus as recited in claim 25, wherein the means for authenticating the ICMP packet by determining if the packet sequence value is valid comprises means for determining if the packet sequence value is within a range of sent but unacknowledged TCP packet sequence values for the connection.

31. An apparatus as recited in claim 25, wherein the means for authenticating the ICMP packet by determining if the packet sequence value is valid comprises means for determining if the packet sequence value is equal to one or more sequence values of one or more packets that are then-currently stored in a TCP re-transmission buffer.

32. An apparatus as recited in claim 25, comprising a router acting as a TCP endpoint node.

33. An apparatus as recited in claim 25, comprising a firewall device.

34. A network element, comprising:

a network interface that is coupled to a data network for receiving one or more packet flows therefrom;

a processor;

one or more stored sequences of instructions which, when executed by the processor, cause the processor to perform the steps of:

receiving an ICMP packet, wherein the ICMP packet carries a packet sequence value that is associated with a connection in a connection-oriented transport protocol, and that identifies a transport protocol segment that caused a node to identify an error and to generate the ICMP packet in response to the error;

obtaining the packet sequence value from the ICMP packet;

authenticating the ICMP packet by determining if the packet sequence value from the ICMP packet is valid; and responding to the ICMP packet to correct the error by updating a maximum transmission unit value or a minimum transmission unit value associated with the connection only if the packet sequence value is determined to be valid.

35. A network element as recited in claim 34, wherein the step of receiving an ICMP packet comprises receiving an ICMP packet, wherein the ICMP packet carries a portion of a TCP header associated with a TCP connection.

36. A network element as recited in claim 34, wherein the step of receiving an ICMP packet comprises receiving an ICMP "endpoint unreachable" error packet.

37. A network element as recited in claim 34, wherein the step of receiving an ICMP packet comprises receiving an ICMP packet that specifies that fragmentation is needed.

38. A network element as recited in claim 34, wherein the step of authenticating the ICMP packet by determining if the packet sequence value is valid comprises determining if the packet sequence value is within a range of packet sequence values that are allowed by the transport protocol for the connection.

39. A network element as recited in claim 34, wherein the step of authenticating the ICMP packet by determining if the packet sequence value is valid comprises determining if the packet sequence value is within a range of sent but unacknowledged TCP packet sequence values for the connection.

40. A network element as recited in claim 34, wherein the step of authenticating the ICMP packet by determining if the packet sequence value is valid comprises determining if the packet sequence value is exactly equal to one or more sequence values of one or more packets that are then-currently stored in a TCP re-transmission buffer, starting at a sequence value of a previously sent segment that resulted in receiving the ICMP packet.

41. A network element as recited in claim 34, wherein the steps are performed in a router acting as a TCP endpoint node.

42. A network element as recited in claim 34, wherein the steps are performed in a firewall device.

* * * * *

UNITED STATES PATENT AND TRADEMARK OFFICE
CERTIFICATE OF CORRECTION

PATENT NO.       : 7,650,635 B2                                                Page 1 of 1
APPLICATION NO.  : 10/820980
DATED            : January 19, 2010
INVENTOR(S)      : Khare et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 922 days.

Signed and Sealed this

Twenty-eighth Day of December, 2010

David J. Kappos
*Director of the United States Patent and Trademark Office*